US011263479B2

(12) United States Patent
Katoh et al.

(10) Patent No.: US 11,263,479 B2
(45) Date of Patent: Mar. 1, 2022

(54) TRAINING APPARATUS, TRAINING METHOD, AND NON-TRANSITORY COMPUTER-READABLE RECORDING MEDIUM

(71) Applicant: FUJITSU LIMITED, Kawasaki (JP)

(72) Inventors: Takashi Katoh, Kawasaki (JP); Kazuki Iwamoto, Osaka (JP); Kento Uemura, Kawasaki (JP); Suguru Yasutomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 16/774,721

(22) Filed: Jan. 28, 2020

(65) Prior Publication Data
US 2020/0242399 A1   Jul. 30, 2020

(30) Foreign Application Priority Data

Jan. 30, 2019 (JP) .............................. JP2019-014036

(51) Int. Cl.
*G06K 9/62* (2006.01)
*G06N 20/00* (2019.01)
*G06T 7/00* (2017.01)

(52) U.S. Cl.
CPC ......... *G06K 9/6234* (2013.01); *G06K 9/6256* (2013.01); *G06N 20/00* (2019.01); *G06T 7/0012* (2013.01); *G06T 2207/20081* (2013.01)

(58) Field of Classification Search
CPC ...... G06N 3/0454; G06N 20/00; G06N 3/084; G06N 3/0472; G06N 3/088; G06N 3/0445; G06N 3/08; G06N 20/10; G06N 3/006; G06N 3/04; G06N 5/003; G06N 7/005; G06N 20/20; G06N 3/0481; G06N 3/10
USPC ........................................................ 382/159
See application file for complete search history.

(56) References Cited

U.S. PATENT DOCUMENTS

2019/0295302 A1* 9/2019 Fu ........................ G06T 7/0002
2020/0034520 A1* 1/2020 Kim ..................... G06N 3/0454

OTHER PUBLICATIONS

EESR—The Extended European Search Report for European Patent Application No. 20154035.8 dated Jul. 1, 2020.
Jost Tobias Springenberg, "Unsupervised and Semi-supervised Learning with Categorical Generative Adversarial Networks", published as conference paper at ICLR2016, retrieved from the Internet: URL: https://arxiv.org/pdf/1511.06390.pdf [retrieved on Sep. 13, 2018], XP055506693, 20 pages.

(Continued)

*Primary Examiner* — Ajibola A Akinyemi
(74) *Attorney, Agent, or Firm* — Fujitsu Patent Center

(57) ABSTRACT

An anomaly detection apparatus generates pieces of image data using a generator and train the generator and a discriminator that discriminates whether an image data, generated by the generator, is real or fake. The anomaly detection apparatus trains the generator such that the generator, in generating the pieces of image data to maximize the discrimination error of the discriminator, generate at least a piece of specified image data to reduce the discrimination error at a fixed rate with respect to the pieces of image data and trains, based on the pieces of image data and the at least a piece of specified image data, the discriminator to minimize the discrimination error.

7 Claims, 16 Drawing Sheets

(56) References Cited

OTHER PUBLICATIONS

Varghese Alex. et al., "Generative Adversarial Networks for Brain Lesion Detection", Progress in Biomedical Optics and Imaging, SPIE—International Society for Optical Engineering, vol. 10133, Feb. 24, 2017, pp. 101330G-101330G, XP060086899.
Schlegl, Thomas et al. "Unsupervised Anomaly Detection with Generative Adversarial Networks to Guide Marker Discovery", International Conference on Information Processing in Medical Imaging. Springer, Cham, 2017.
M.Sabokrou,et al. "Adversarially Learned One-Class Classifier for Novelty Detection", Proceedings of IEEE Conference on Computer Vision and Pattern Recognition, 2018.

* cited by examiner

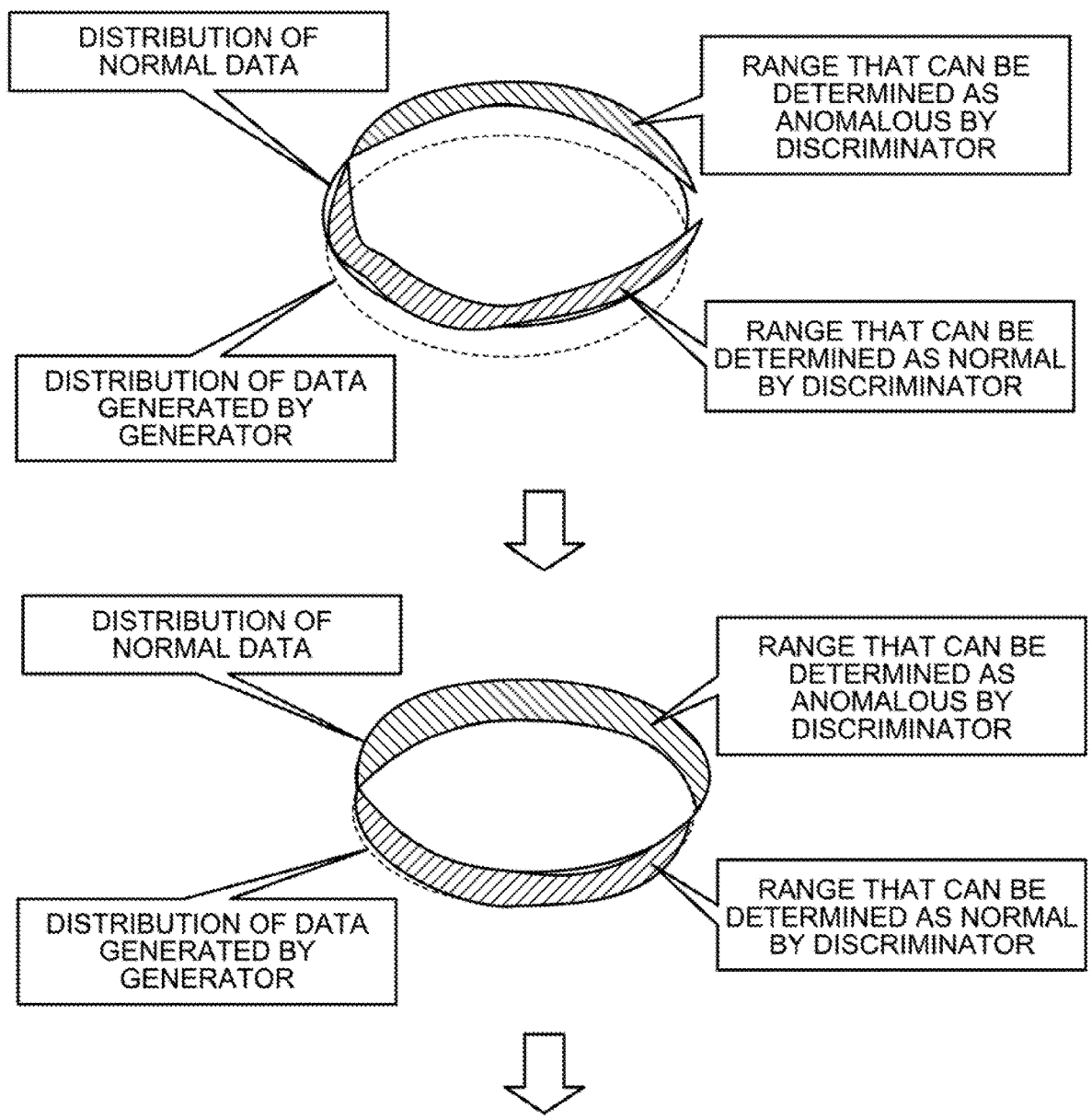

TRAINING APPARATUS, TRAINING METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2019-014036, filed on Jan. 30, 2019, the entire contents of which are incorporated herein by reference.

FIELD

The embodiments discussed herein are related to a training apparatus, a training method, and a training program.

BACKGROUND

In recent years, in the field of medical image analysis or the like, an anomaly, such as a lesion, is detected using image data. In particular, in the field of medicine or the like, it is often difficult to obtain image data of anomalous states for use in training data; therefore, there is a demand for machine using only image data of normal states and there is also a demand for an increase in a detection speed in order to handle large amounts of precise and large-scale data.

In the circumstances as described above, as an anomaly detection method using machine training, generative adversarial networks (GANs) for estimating a distribution of normal data and detecting data deviating from the distribution as anomalous data have been known. FIG. 15 is a diagram for explaining a GAN. As illustrated in FIG. 15, the GAN is a training model that includes a generator and a discriminator and that is for unsupervised training in which a network for training the generator and a network for training the discriminator are trained simultaneously.

In the GAN, the generator is trained to generate fake data that is similar to real data from input data, such as noise, and the discriminator is trained to discriminate whether the data generated by the generator is real data or fake data. As anomaly detection using the GAN, a method of determining whether a trained generator has a capability to generate a given sample and regarding generated data as anomalous data if the trained generator does not have the capability, and a method of regarding data that is determined as fake data by the trained discriminator as anomalous data are used.

Non Patent Document 1: Schlegl, Thomas, et al. "Unsupervised anomaly detection with generative adversarial networks to guide marker discovery.", International Conference on Information Processing in Medical Imaging. Springer, Cham, 2017.

Non Patent Document 2: M. Sabokrou, et al. "Adversarially Learned One-Class Classifier for Novelty Detection", Proceedings of IEEE Conference on Computer Vision and Pattern Recognition. 2018.

SUMMARY

According to an aspect of an embodiment, a training apparatus includes a memory; and a processor coupled to the memory, wherein the processor is configured to: generate pieces of image data using a generator; and train the generator and a discriminator that discriminates whether an image data, generated by the generator, is real or fake, the training including: training the generator such that the generator, in generating the pieces of image data to maximize the discrimination error of the discriminator, generate at least a piece of specified image data to reduce the discrimination error at a fixed rate with respect to the pieces of image data; and training, based on the pieces of image data and the at least a piece of specified image data, the discriminator to minimize the discrimination error.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5A is a diagram for explaining a discriminator after end of the training and a problem with a general technique;

DESCRIPTION OF EMBODIMENTS

However, in the techniques as described above, in some cases, the capability of the discriminator to detect anomalies may be reduced. Specifically, when the discriminator is used, characteristics of the discriminator depend on data other than normal data that is erroneously generated by the generator at the end of training, so that omission of detection may increase. For example, the discriminator is expected to have the capability to discriminate a difference between normal data and an output from the generator; however, the discriminator is not able to train data that is not included in the output from the generator and not included in the normal data, so that it is impossible to expect a specific output. Meanwhile, a method using the generator needs a high detection cost, and therefor is not suitable for anomaly detection for which high-speed performance is needed.

Preferred embodiments of the present invention will be explained with reference to accompanying drawings. The present invention is not limited by the embodiments below. In addition, the embodiments may be combined as appropriate as long as no contradiction is derived.

[a] First Embodiment

Description of Anomaly Detection Apparatus 10

Figure 1:
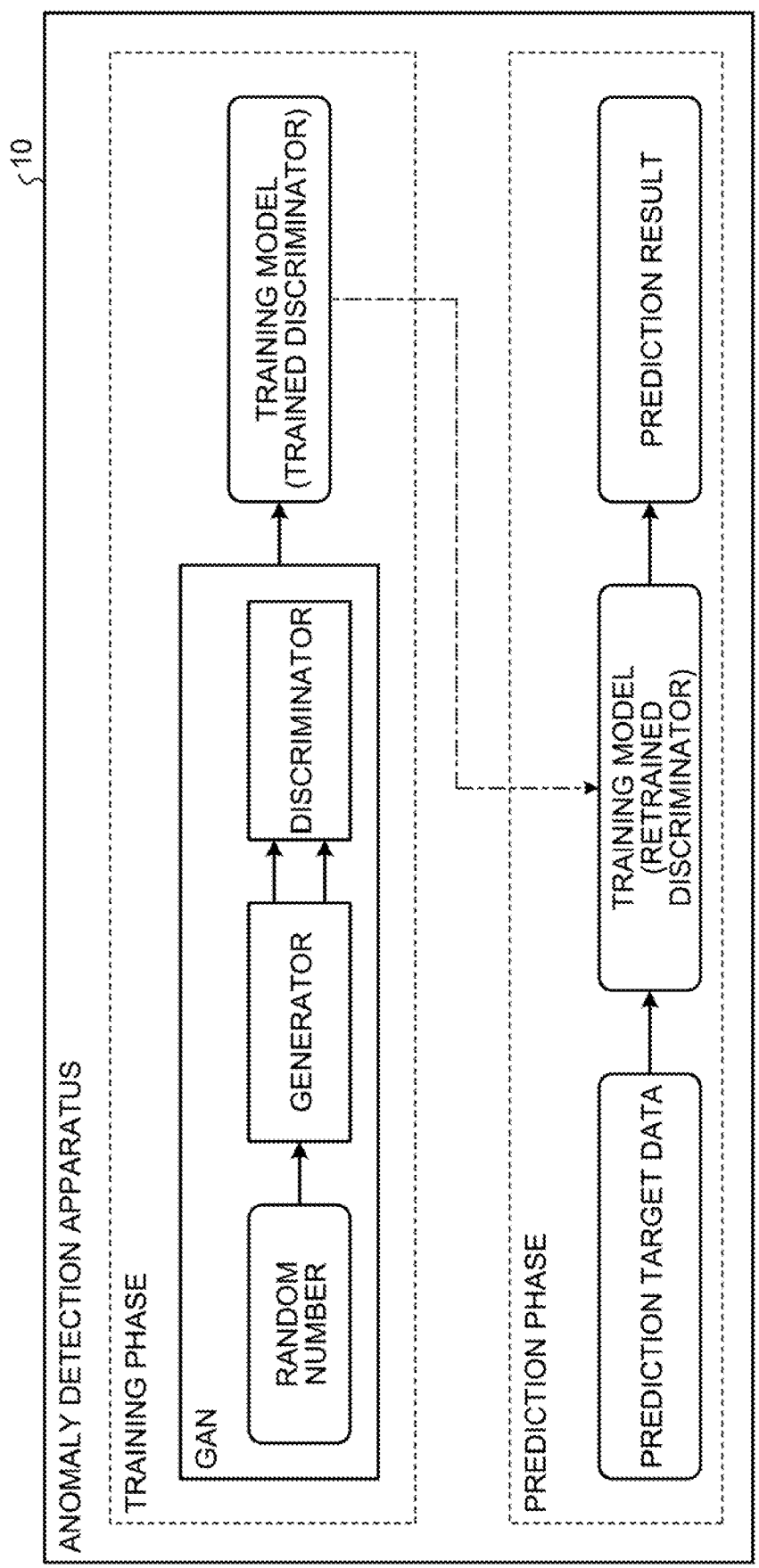
FIG. 1 is a diagram for explaining an anomaly detection apparatus according to a first embodiment.

FIG. 1 is a diagram for explaining an anomaly detection apparatus 10 according to a first embodiment. As illustrated in FIG. 1, the anomaly detection apparatus 10 is an example of a training apparatus that trains, in a training phase, a generator and a discriminator by a GAN, and performs, in a prediction phase, anomaly detection with respect to prediction target image data by using the trained discriminator.

Figure 2:
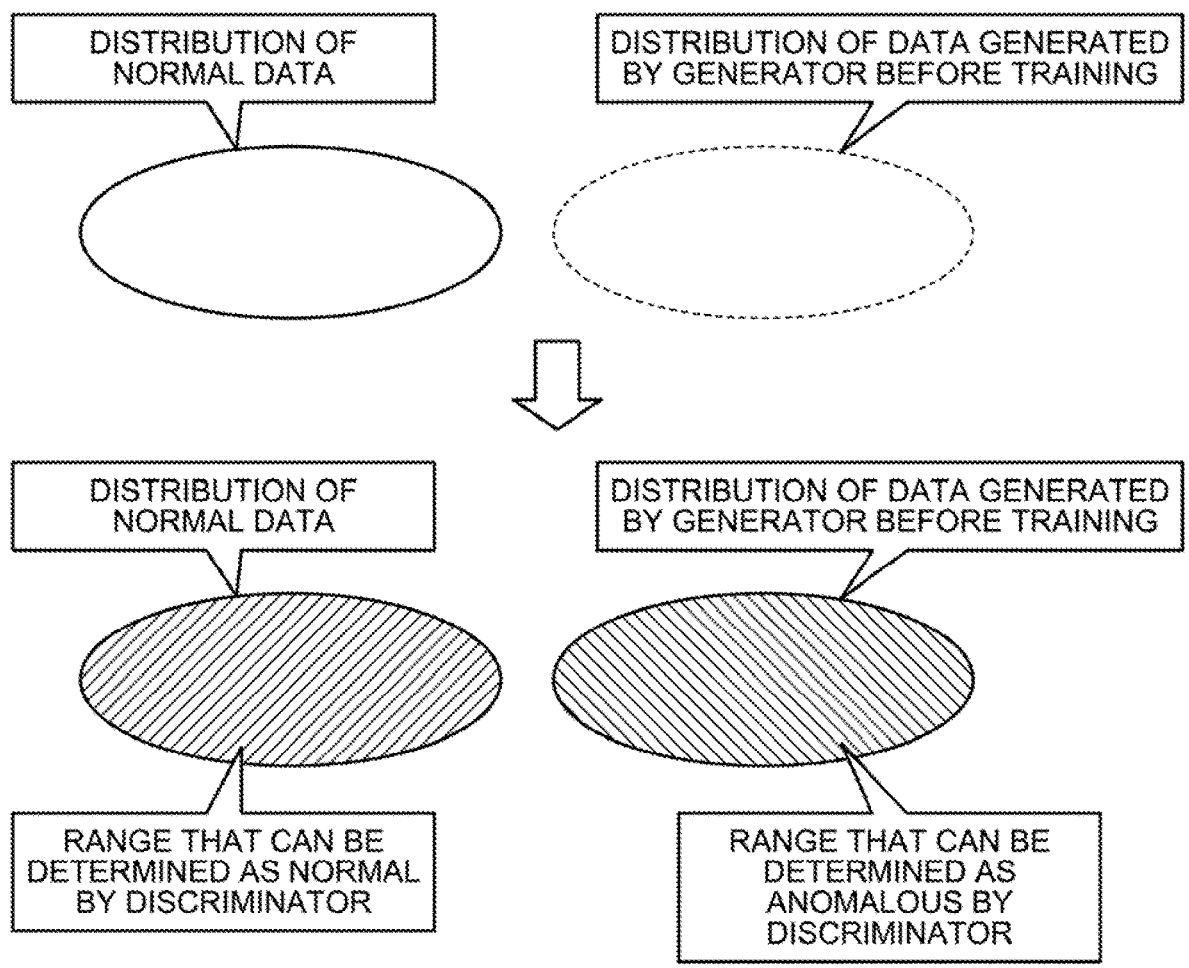
FIG. 2 is a diagram for explaining a step before training.
Figure 3:
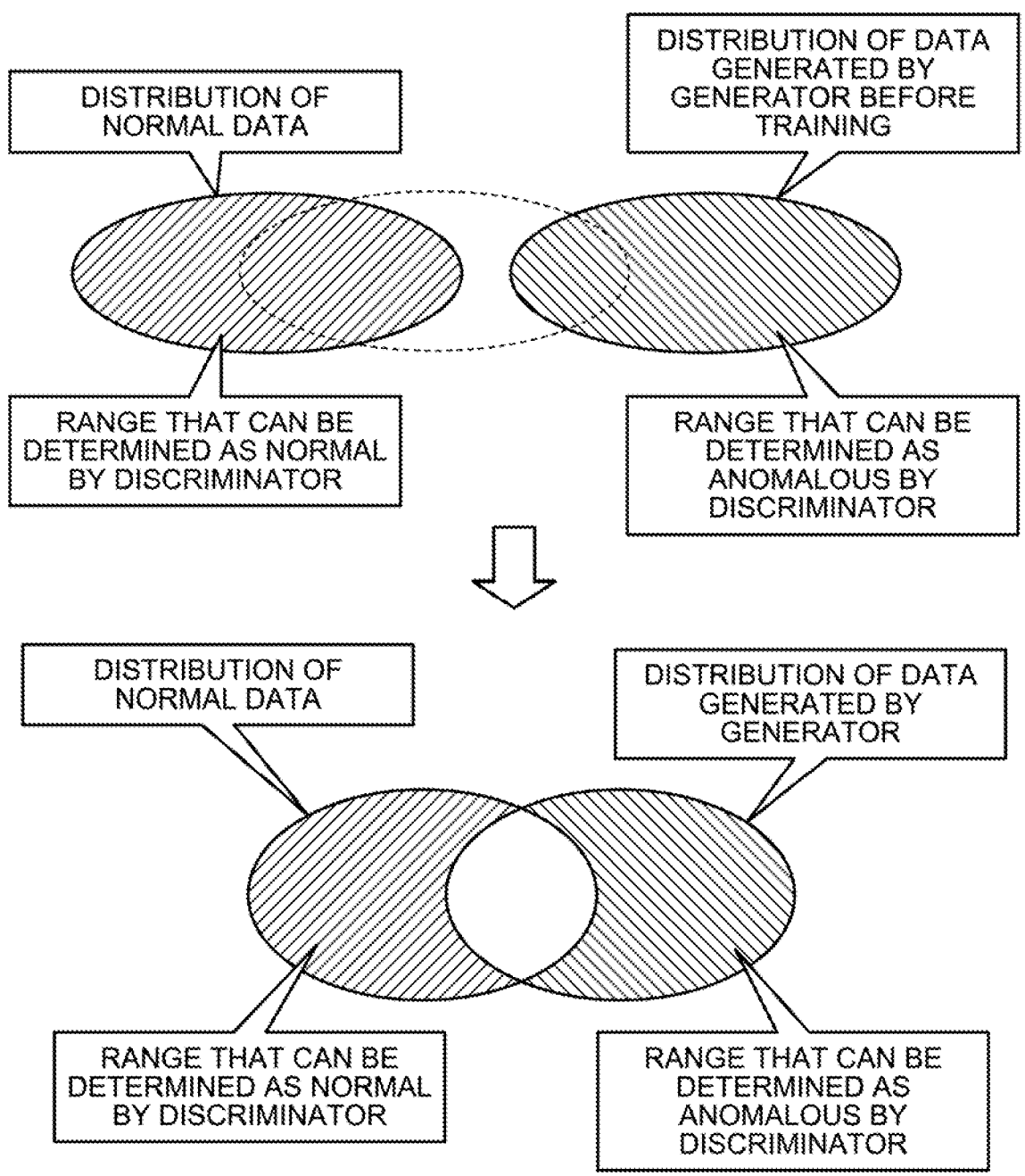
FIG. 3 is a diagram for explaining a step after start of the training.
Figure 4:
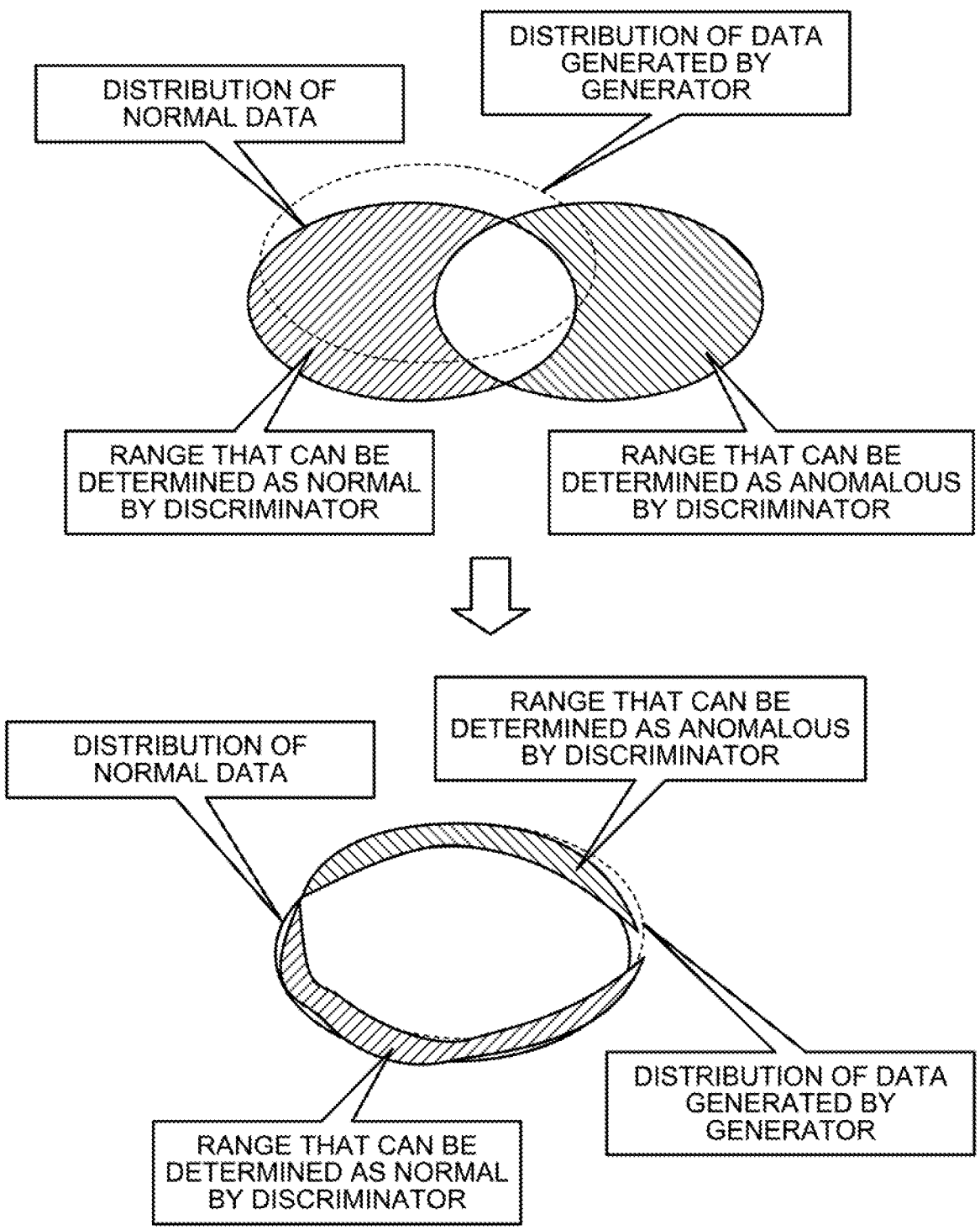
FIG. 4 is a diagram for explaining a step during the training.
Figure 5B:
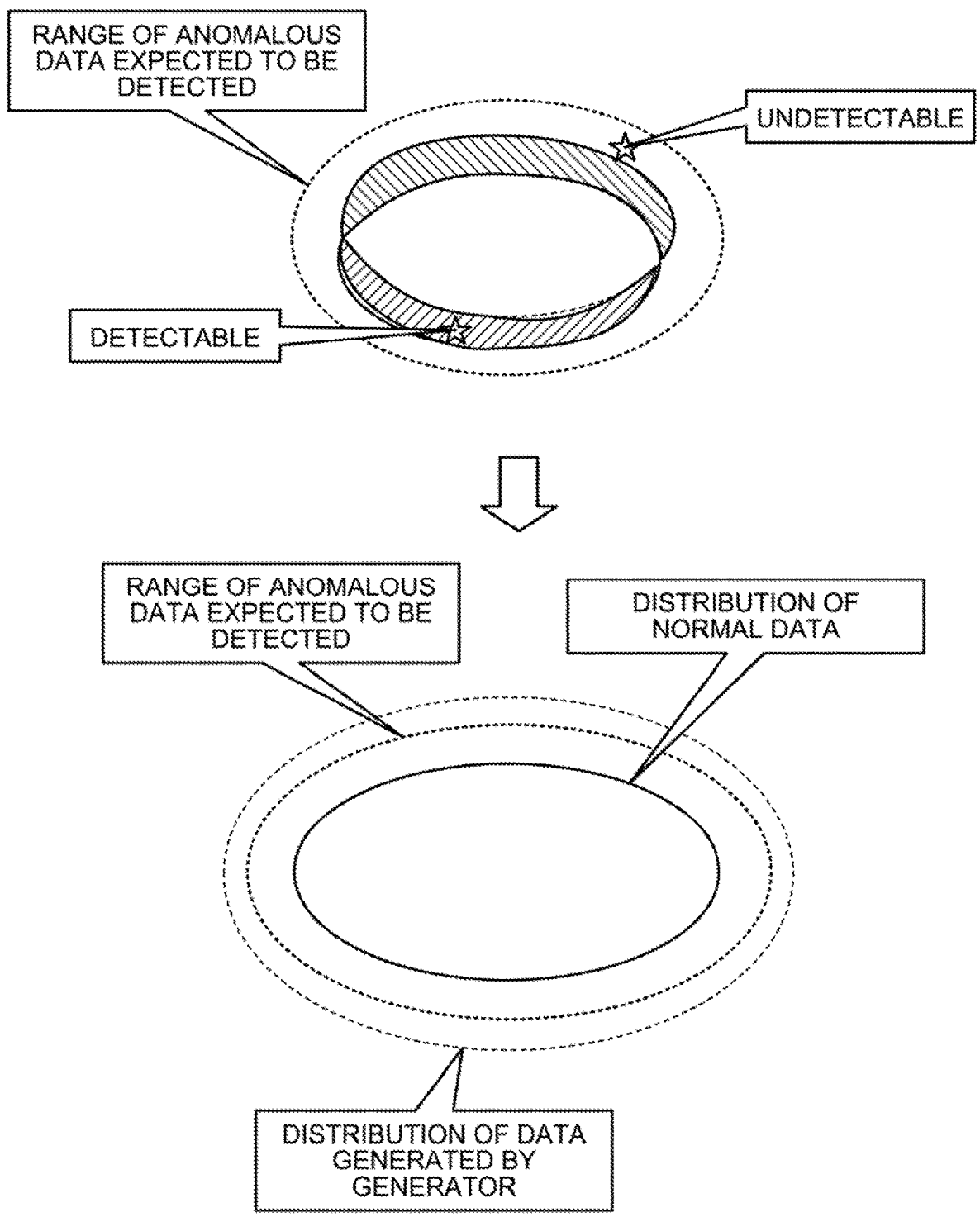
FIG. 5B is a diagram for explaining the discriminator after the end of the training and the problem with the general technique.

Meanwhile, in using a general GAN, in some cases, a capability of the discriminator to detect anomalies may be reduced. A problem with the general GAN will be described below with reference to FIG. 2 to FIG. 5B. In FIG. 2 to FIG. 5B, with respect to the training using the general GAN, steps before start of the training, during the training, and after end of the training are illustrated. FIG. 2 is a diagram for explaining the step before the training. FIG. 3 is a diagram for explaining the step after the start of the training. FIG. 4 is a diagram for explaining the step during the training. FIG. 5A and FIG. 5B are diagrams for explaining the discriminator after the end of the training and a problem with a general technique.

As illustrated in FIG. 2, before the training, the generator generates data in a different distribution from a distribution of normal data, and the discriminator trains a difference between the distribution of the normal data and the distribution of the data generated by the generator. In other words, the discriminator clearly distinguishes and discriminates between the distribution of the normal data and the distribution of the data generated by the generator.

Subsequently, as illustrated in FIG. 3, upon start of the training, training of the generator proceeds such that data to be discriminated as normal by the discriminator increases and data to be discriminated as anomalous decreases. In other words, the generator is trained to generate data that may be erroneously discriminated by the discriminator, and is thus trained such that the distribution of the data generated by the generator includes a range that can be determined as normal by the discriminator. In contrast, when the distribution of the data generated by the generator is changed with the start of the training, a probability of a discrimination result indicating that data is discriminated as normal is changed; therefore, the discriminator trains a difference between the distribution of the normal data and the distribution of the data generated by the generator.

Subsequently, when the training proceeds from the time point as illustrated in FIG. 3, as illustrated in FIG. 4, training is performed such that the distribution of the data generated by the generator includes the range that can be discriminated as normal by the discriminator in FIG. 3. In other words, the distribution of the data generated by the generator is updated so as to be largely included in the range that can be discriminated as normal by the discriminator. In contrast, the discriminator is trained to discriminate between the distribution of data generated by the updated generator and the distribution of the normal data.

When the training proceeds further, as illustrated in FIG. 5A, the generator is trained to mimic data in the range that can be discriminated as normal by the discriminator in the state as illustrated in FIG. 4, to thereby cause the discriminator to make a mistake, so that the distribution of the data generated by the generator is updated so as to include the range that can be discriminated by the discriminator in FIG. 4. When the training is completed, the trained discriminator is trained to discriminate between the data generated by the generator and the normal data (real data).

However, in the general GAN, characteristics of the discriminator depend on data other than normal data that is erroneously generated toy the generator at the end of training, so that omission of detection may increase. Specifically, as illustrated in FIG. 5B, it is possible to accurately detect an anomaly with respect to anomalous data that is present in a range that, can be determined as anomalous by the trained discriminator, but it is impossible to detect anomalous data that is present outside the range. In other words, in the general GAN, in some cases, it may be difficult to train the discriminator to the same extent as a range of anomalous data that are expected to be detected.

One of the causes of this problem is that, in a training method based on the general GAN, training proceeds such that the generator generates only data that can be expected as normal data, and therefore, it is difficult to maintain a state in which the distribution of the data generated by the generator and the distribution of the normal data do not match. In other words, the generator attempts to generate only data to be determined as normal data by the discriminator.

To cope with this, the anomaly detection apparatus 10 determines whether to maximize or minimize a discrimination error for each piece of image data output by the generator. Then, the anomaly detection apparatus 10 trains the discriminator in accordance with one of determined training indices indicating maximization and minimization, and trains the generator in accordance with the other one of the training indices, for each piece of generated image data.

In other words, by using the generator capable of exhaustively generating anomalous data that are expected to be present around normal data, it becomes possible to detect anomalous data that may be omitted in the general technique. Specifically, the generator is controlled such that a loss occurs at a constant rate when generating data that is to be determined as normal data by the discriminator, so that, as illustrated in FIG. 5B, the distribution of the data generated by the generator includes the range of anomalous data that are expected to be detected. In this manner, by extending a training range of the discriminator, it is possible to prevent reduction of the capability of the discriminator to detect anomalies.

Functional Configuration

Figure 6:
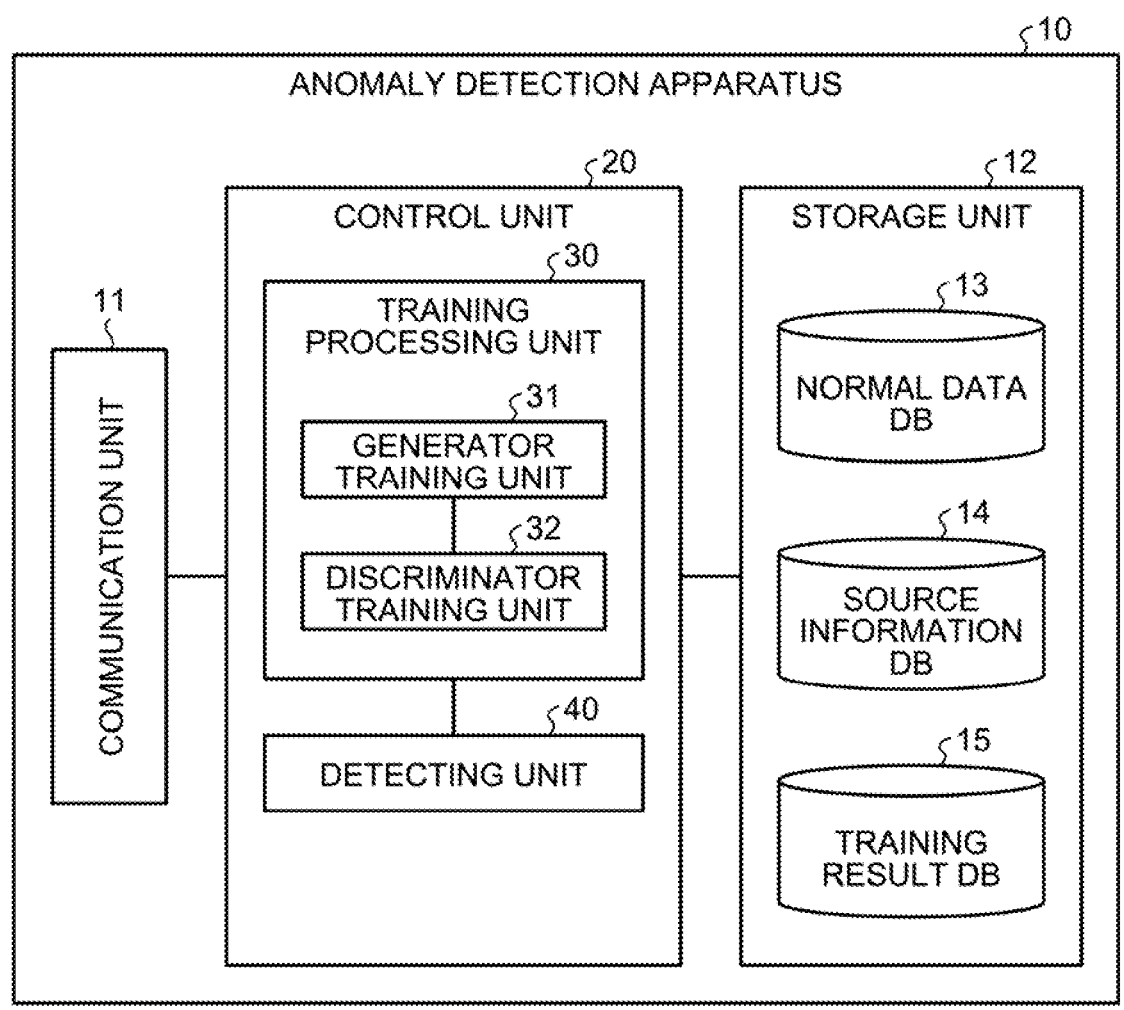
FIG. 6 is a functional block diagram illustrating a functional configuration of the anomaly detection apparatus according to the first embodiment.

FIG. 6 is a functional block diagram illustrating a functional configuration of the anomaly detection apparatus 10 according to the first embodiment. As illustrated in FIG. 6, the anomaly detection apparatus 10 includes a communication unit 11, a storage unit 12, and a control unit 20.

The communication unit 11 is a processing unit that controls communication with other apparatuses, and is, for example, a communication interface or the like. For example, the communication unit 11 receives, from an administrator terminal, an instruction to start various processes, normal data, prediction target data, and the like, and transmits, to the administrator terminal, a training result, a prediction result, and the like.

The storage unit 12 is one example of a storage device that stores therein various kinds of data and programs to be executed by the control unit 20, and is, for example, a memory, a hard disk, or the like. The storage unit 12 stores therein a normal data database (DB) 13, a source information DB 14, a training result DB 15, and the like.

The normal data DB 13 is a database for storing image data that is obtained by capturing an image of an internal organ or the like in a normal state. For example, the normal data DB 13 stores therein normal data that is used in training of the discriminator by the GAN.

The source information DB 14 is a database for storing information serving as a source for data generation performed by the generator. For example, the source information DB 14 stores therein information, such as a random number, random noise, or a latent variable, which is what is called a seed.

The training result DB 15 is a database for storing training results of the generator and the discriminator. For example, the training result DB 15 stores therein, as training results of the generator and the discriminator using the GAN and a retraining result, of the discriminator, various parameters by which it is possible to generate the trained generator and the trained discriminator for each of which training is completed.

The control unit 20 is a processing unit that controls the entire anomaly detection apparatus 10, and is, for example, a processor or the like. The control unit 20 includes a training processing unit 30 and a detecting unit 40, trains a discriminator with high discrimination accuracy, and performs anomaly detection with respect to input prediction target image data.

The training processing unit 30 is a processing unit that includes a generator training unit 31 and a discriminator training unit 32, and trains the generator and the discriminator using the GAN. For example, the training processing unit 30 determines whether to perform training for maximizing a discrimination error of the discriminator or training for minimizing the discrimination error. Then, when performing training such that the discriminator maximizes the discrimination error, the training processing unit 30 trains the generator so as to minimize the discrimination error, and when performing training such that the discriminator minimizes the discrimination error, the training processing unit 30 trains the generator so as to maximize the discrimination error.

The generator training unit 31 is a processing unit that trains the generator of the GAN. Specifically, the generator training unit 31 trains the generated based on the general GAN and simultaneously trains the generator such that a loss occurs in the generator at a constant rate when the generator generates data that is to be determined as normal data by the discriminator.

For example, the generator training unit 31 causes the generator to generate image data by using the seed that is stored in the source information DB 14. Then, the generator training unit 31 inputs the generated image data (hereinafter, may be described as generated data) to the discriminator and acquires a discrimination result of the discriminator. Then, the generator training unit 31 trains the generator by using the discrimination result such that the generated data can be discriminated as normal data by the discriminator.

Here, the generator training unit 31 generates, at a constant rate, such as once every a predetermined number of times, data to be discriminated as anomalous by the discriminator, and trains the generator. For example, the generator normally performs training while receiving a reward when the generated data is discriminated as anomalous by the discriminator, and, at a constant rate, the generator generates data that can be accurately discriminated as anomalous by the discriminator and performs training while receiving a reward when the generated data is accurately determined as anomalous by the discriminator. In other words, the generator training unit 31 causes, at a constant rate, the generator to generate the anomalous data that is expected to be detected as illustrated in FIG. 5B, and trains the discriminator and the generator.

More specifically, the generator generates data that confuses the discriminator while preventing the data from being detected as anomalous by the discriminator, and performs training. In the meantime, at a constant rate, the generator generates data that does not confuse the discriminator while allowing the data to be detected as anomalous by the discriminator, and performs training such that the abnormal data can be accurately discriminated as anomalous by the discriminator. As a training method, a method of performing training while inverting a loss function of the generator at a constant rate, or the like may be applicable.

The discriminator training unit 32 is a processing unit that trains the discriminator of the GAN. Specifically, similarly to the general GAN, the discriminator training unit 32 trains the generator such that the discriminator is able to distinguish between the normal data stored in the normal data DB 13 and the generated data generated by the generator. In other words, the discriminator is trained to minimize the discrimination error.

For example, the discriminator training unit 32 acquires the generated data from the generator, inputs the generated data to the discriminator, and acquires an output result of the discriminator. Then, the discriminator training unit 32 trains the discriminator such that, regarding a probability of normality indicating the normal data included in the output, result and a probability of anomaly indicating the generated data, the probability of anomaly increases and the probability of normality decreases.

In other words, the discriminator training unit 32 causes the discriminator to train a difference between the distribution of the generated data generated by the generator and the distribution of the normal data. If training is completed, the discriminator training unit 32 stores information on the trained discriminator in the training result DB 15.

Figure 7:
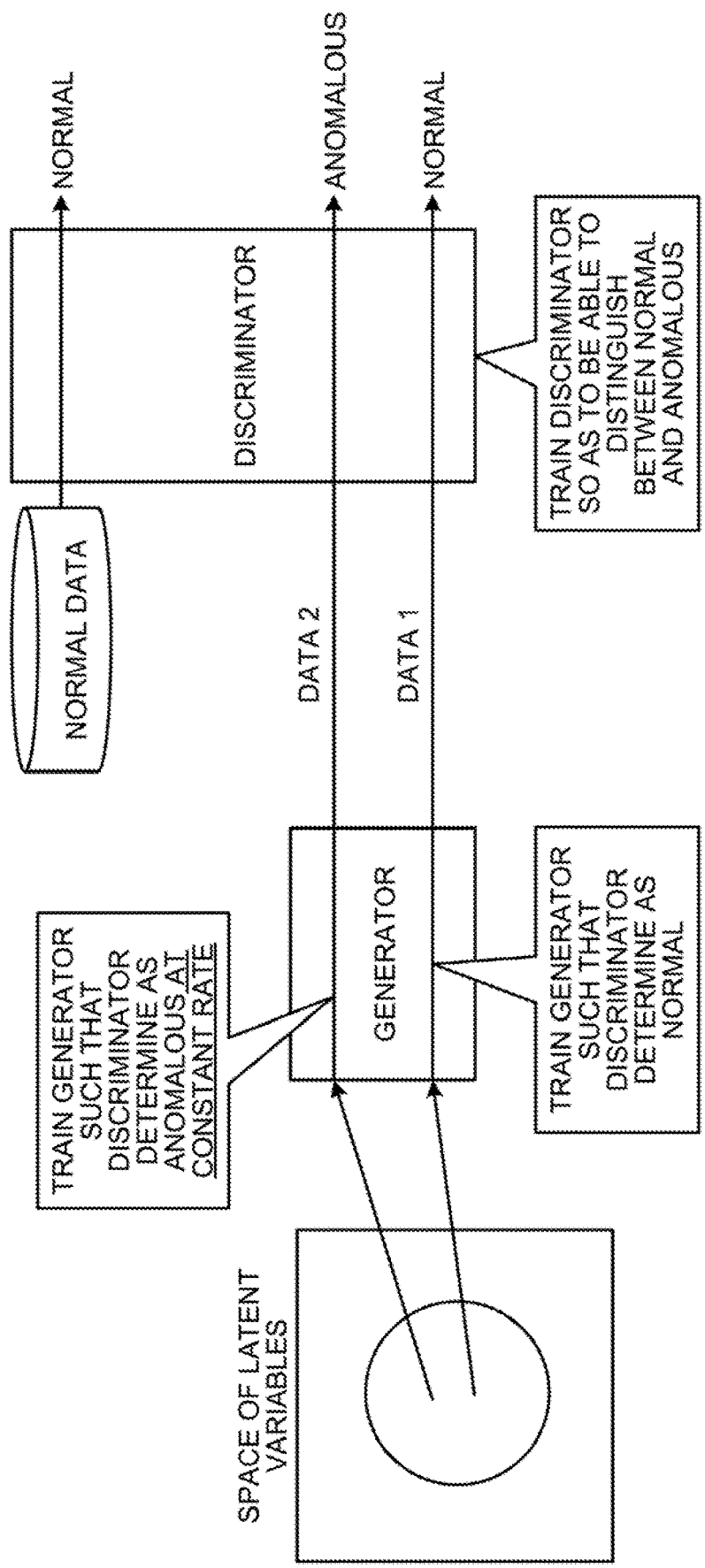
FIG. 7 is a diagram for explaining a training process according to the first embodiment.

The training process will be described in detail below. FIG. 7 is a diagram for explaining the training process according to the first embodiment. In general, the generator generates data using a seed, inputs the generated data to the discriminator, and is trained to fool the discriminator such that the generated data is discriminated as normal data by the discriminator, on the basis of the discrimination result of the discriminator.

In the first embodiment, as illustrated in FIG. 7, the generator divides the generated data into data 1 and data 2, and inputs each piece of the data to the discriminator at a constant rate. The discriminator is trained to discriminate the normal data as normal data and discriminate the generated data (the data 1 and the data 2) as anomalous data. Further, the generator is trained such that the discriminator discriminates the data 1 as normal and discriminates the data 2 as anomalous.

The detecting unit 40 is a processing unit that detects an anomaly from input image data. For example, if the training processing unit 30 completes training, the detecting unit 40 reads a parameter or the like related to the trained discriminator from the training result DB 15 and constructs the discriminator. Then, upon receiving prediction target image data, the detecting unit 40 inputs the image data to the constructed discriminator and obtains an output result.

Here, as for the probability of normality indicating the normal data included in the output result and the probability of anomaly indicating the generated data, if the probability of normality is higher, the detecting unit 40 discriminates the input image data as normal image data, and if the probability of anomaly is higher, the detecting unit 40 discriminates the input image data as anomalous image data. Then, the detecting unit 40 transmits a discrimination result to the administrator terminal, displays the discrimination result on a display unit, such as a display, or stores the discrimination result in the storage unit 12.

Figure 8:
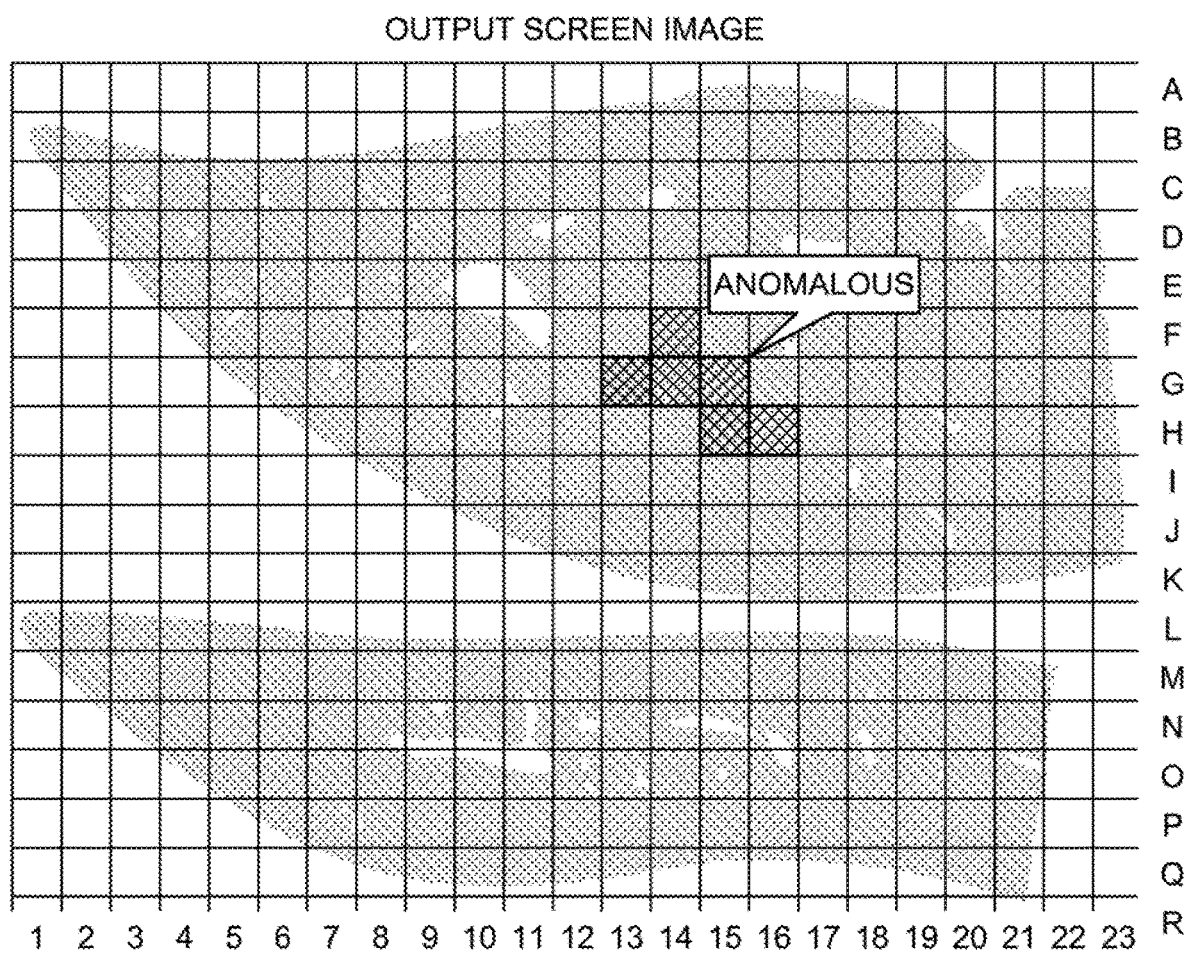
FIG. 8 is a diagram for explaining an example of a detection result.

FIG. 8 is a diagram for explaining an example of a detection result. As illustrated in FIG. 8, the detecting unit 40 first divides an input image that is a prediction target into small regions, thereafter inputs the image data to the trained discriminator, and acquires a discrimination result. Then, the detecting unit 40 is able to provide a user with regions that are determined as anomalous by the discriminator.

Flow of Training Process

Figure 9:
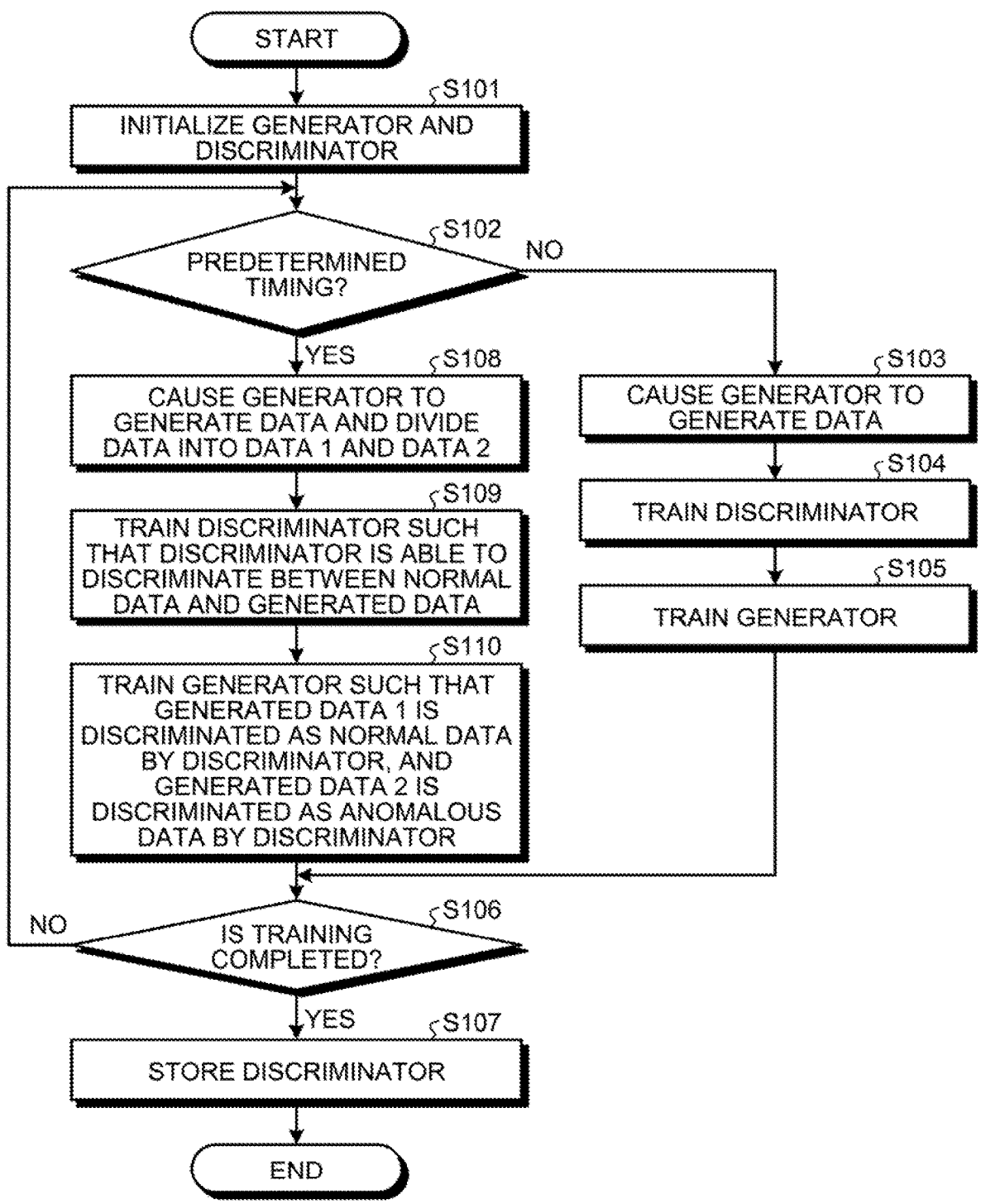
FIG. 9 is a flowchart illustrating the flow of the training process according to the first embodiment.

FIG. 9 is a flowchart illustrating the flow of the training process according to the first embodiment. As illustrated in FIG. 9, if an instruction on the training process is issued, the training processing unit 30 initializes the generator and the discriminator (S101).

If a predetermined timing has not come (S102: No), the training processing unit 30 causes the generator to generate data (generated data), inputs the generated data to the discriminator (S103), and trains the discriminator such that the discriminator is able to discriminate between the normal data and the generated data (S104). Further, the training processing unit 30 trains the generator such that the generated data can be discriminated as normal data by the discriminator (S105).

Thereafter, if the training is continued (S106: No), the training processing unit 30 repeats the processes from S102. In contrast, if the training is completed (S106: Yes), the training processing unit 30 stores the discriminator (S107).

In contrast, at S102, if it is determined that the predetermined timing has come (S102: Yes), the training processing unit 30 causes the generator to generate data (generated data) and divides the generated data into the data 1 and the data 2 (S108).

Subsequently, the training processing unit 30 inputs the data 1 and the data 2 to the discriminator, and trains the discriminator such that the discriminator is able to discriminate between the normal data and the generated data (the data 1 and the data 2) (S109). Then, the training processing unit 30 trains the generator such that the data 1 is discriminated as normal data by the discriminator and the data 2 is discriminated as anomalous data by the discriminator (S110). Thereafter, the training processing unit 30 performs the processes at S106 and S107.

Flow of Detecting Process

Figure 10:
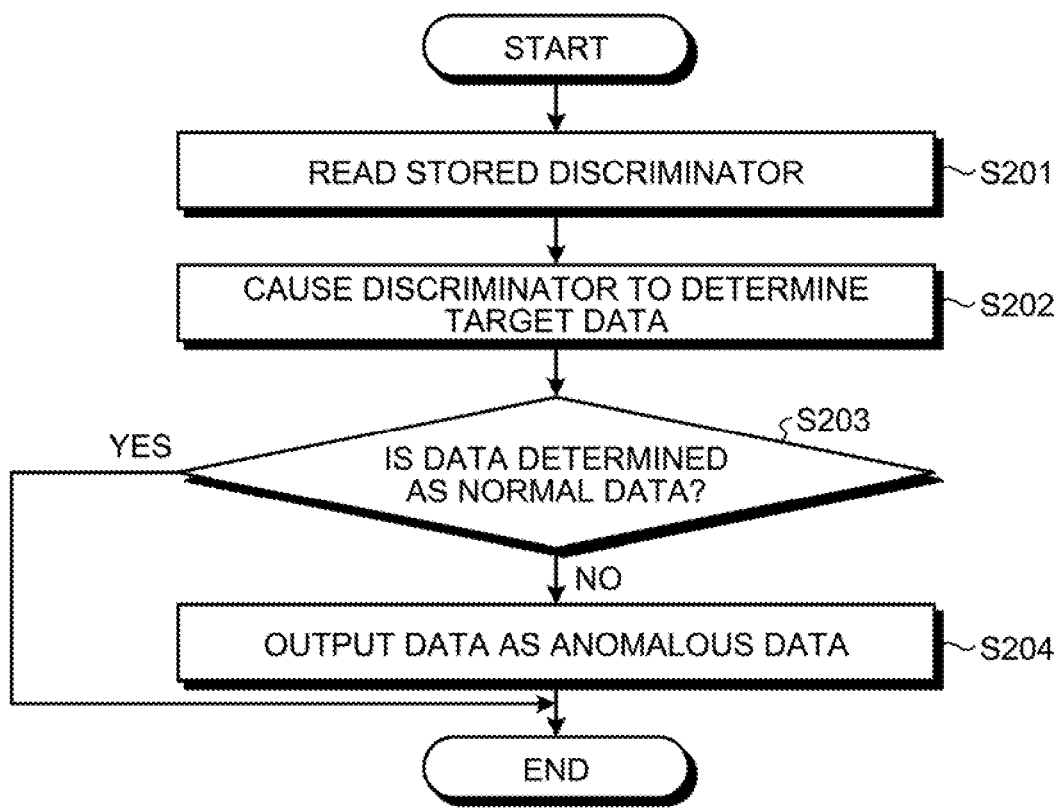
FIG. 10 is a flowchart illustrating the flow of a detecting process according to the first embodiment.

FIG. 10 is a flowchart illustrating the flow of a detecting process according to the first embodiment. As illustrated in FIG. 10, if an instruction on the detecting process is issued, the detecting unit 40 reads the stored discriminator (S201). Subsequently, the detecting unit 40 inputs target data to the discriminator and determines (discriminates) whether the target data is anomalous (S202).

If the detecting unit 40 determines that the target data is normal (S203: Yes), the detecting unit 40 terminates the process. If the detecting unit 40 does not determine that the target data is normal (S203: No), the detecting unit 40 outputs the target data as anomalous data (S204).

Effects

As described above, the anomaly detection apparatus 10 focuses on the fact that, for example, anomalous data desired to be detected in a medical procedure does not appear at a position largely deviated from the distribution of the normal data, and incorporates, at a constant rate, training to enable the discriminator to accurately discriminate an anomaly inversely with normal training, in addition to normal training of the generator based on the general GAN. For example, a loss of the discriminator increases with progress of the training and thereafter follows the training of the generator, so that the loss decreases. In contrast, by producing a loss of the generator at a constant rate, the distribution of the data generated by the generator is deviated from the distribution of the normal data. In other words, the generator is able to generate, at a constant rate, anomalous data close to the distribution of the the normal data, so that it is possible to extend the training range of the discriminator. As a result, it is possible to prevent reduction of the capability of the discriminator to detect anomalies.

[b] Second Embodiment

In the first embodiment, the example has been described in which the generator generates the data 1 and the data 2 by dividing the generated data, but a method of generating the data that produces the loss of the generator is not limited to this example. For example, by changing a rate of occurrence of the loss in accordance with a value of a seed that is used as a source for data generation by the generator, it is possible to control a range of the generated anomalous data. For example, when random numbers from 0 to 1 are used as seeds, the data 1 is generated using numbers from 0.2 to 0.8 and the data 2 is generated using the rest of the numbers.

Figure 11:
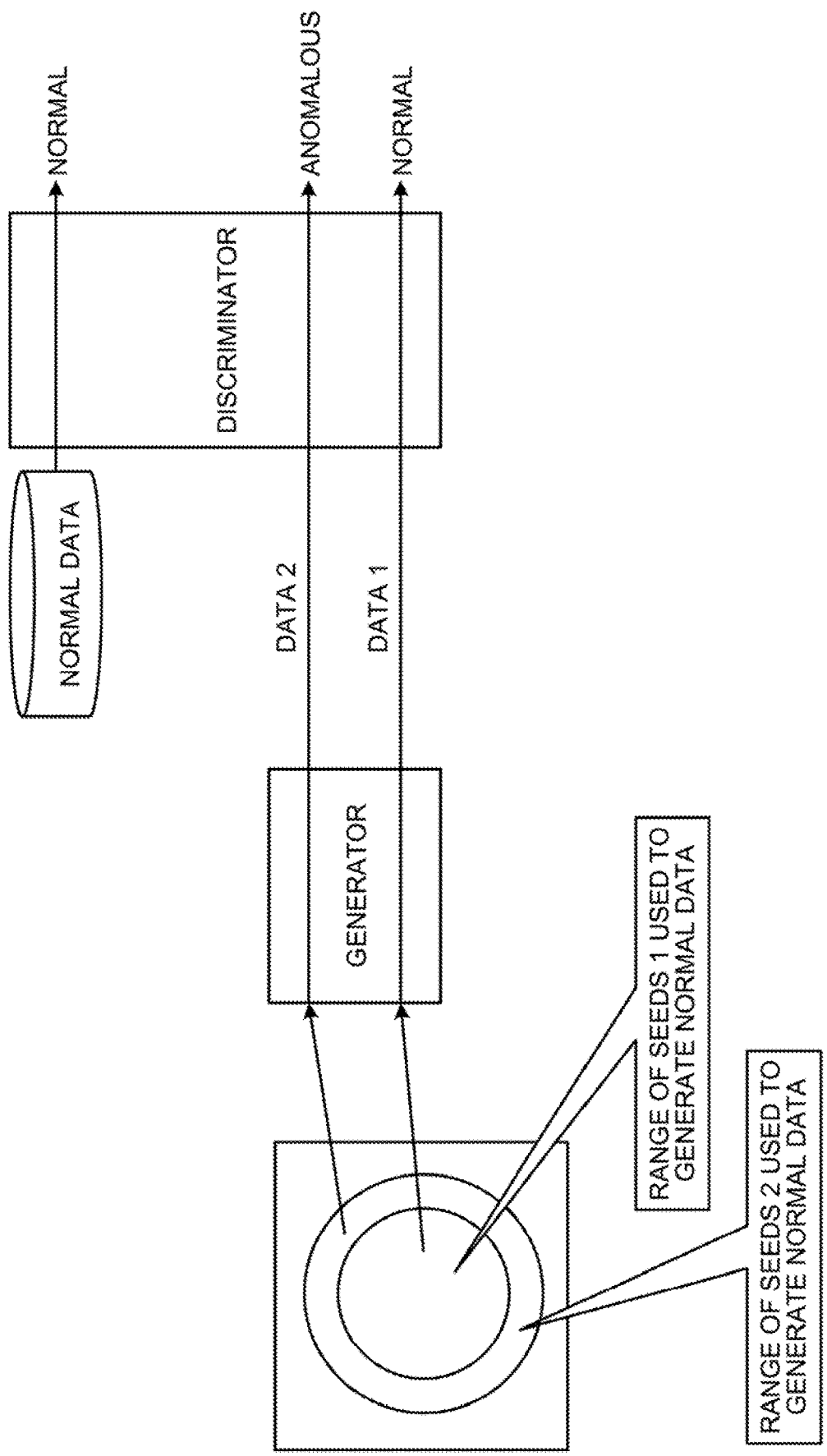
FIG. 11 is a diagram for explaining a training process according to a second embodiment.

FIG. 11 is a diagram for explaining a training process according to the second embodiment. As illustrated in FIG. 11, the training processing unit 30 sets a range of seeds 1 that are used to generate normal data and a range of seeds 2 that are used to generate anomalous data, among seeds that are stored in the source information DB 14. The range of the seeds 2 is set in the vicinity of the seeds 1. Further, a space of the seeds may be one-dimension, a two-dimensions, or three-dimensions.

The training processing unit 30 performs training based on the general GAN, and, at a constant rate, the training processing unit 30 generates the data 1 using the seed 1, generates the data 2 using the seed 2, and inputs each of the data 1 and the data 2 to the discriminator. Thereafter, the same training as the first embodiment is performed.

Figure 12:
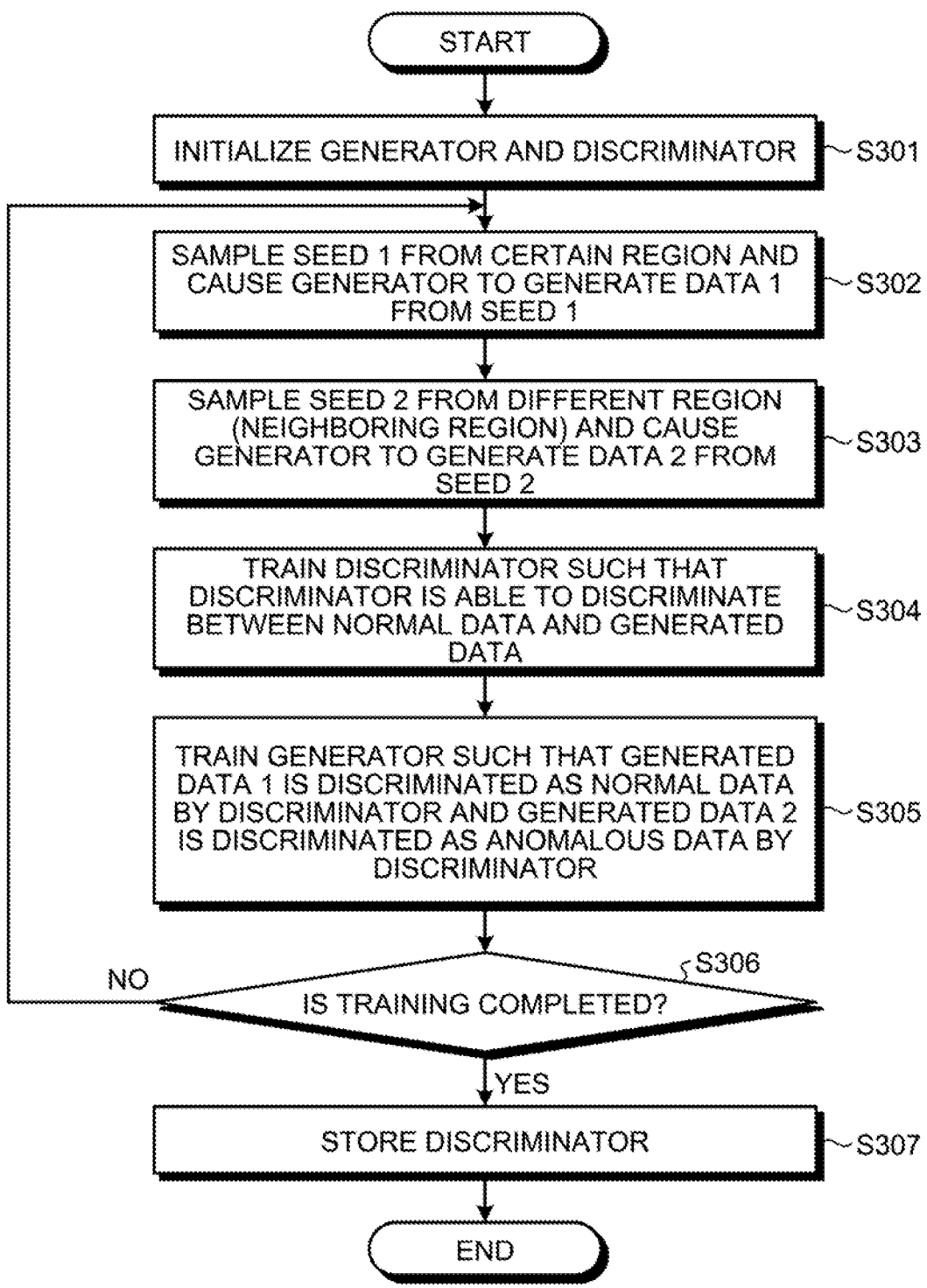
FIG. 12 is a flowchart illustrating the flow of the training process according to the second embodiment.

FIG. 12 is a flowchart illustrating the flow of the training process according to the second embodiment. The flow of the training process based on the general GAM is the same as the flow of the processes from S101 to S107 in FIG. 9, and therefore, detailed explanation thereof will be omitted. Only the flow of processes different from the first embodiment will be described below. Specifically, in the second embodiment, processes corresponding to the flow of the processes at S101, S102 (Yes), S108 to S110, S106, and S107 in FIG. 9 will be described.

As illustrated in FIG. 12, if an instruction on the training process is issued, the training processing unit 30 initializes the generator and the discriminator (S301). Then, the training processing unit 30 samples the seed 1 from a certain region stored in the source information DB 14, and generates the data 1 from the seed 1 (S302). Further, the training processing unit 30 samples the seed 2 from a different region from that of the seed 1 among pieces of information stored in the source information DB 14, and generates the data 2 from the seed 2 (S303).

Subsequently, the training processing unit 30 inputs the data 1 and the data 2 to the discriminator, and trains the discriminator such that the discriminator is able to discriminate between the normal data and the generated data (the data 1 and the data 2) (S304). Then, the training processing unit 30 trains the generator such that the data 1 is discriminated as normal data by the discriminator and the data 2 is discriminated as anomalous data by the discriminator (S305).

Thereafter if the training is continued (S306: No), the training processing unit 30 repeats the processes from S302. In contrast, if the training is completed (S306: Yes), the training processing unit 30 stores the discriminator (S307).

As described above, by setting, in advance, a source for generating the data 1 that is used for training such that the discriminator is confused as in a normal manner, and a source for generating the data 2 that is used for training such that the discriminator is not confused, the training processing unit 30 is able to improve the accuracy of the data 2. For example, it is possible to predict that the abnormal data does not present at a position largely deviated from the distribution of the normal data, but is present in the vicinity of the normal data. Further, it is possible to expect that data of the same seed is generated from neighboring seeds.

Therefore, by generating abnormal data from a seed that is present; in the vicinity of a seed of normal data and that is expected to correspond to abnormal data, it is possible to train the discriminator by using abnormal data that is desired to be eventually detected. Therefore, by setting the range of the seeds 2, that are present in the vicinity of the seeds 1 corresponding to the data 1 used to fool the discriminator and that are not included in the seeds 1, in the vicinity of the range of the seeds 1, and causing the generator to generate the data 2 using the seeds 2, the training processing unit 30 is able to improve the accuracy of the discriminator. In particular, it is possible to use, as new seeds, peripheries of a distribution of seeds used by a normal GAN, and increase the above-described percentage of the new seeds; therefore, the technique is particularly effective when the number of variations of normal data is small.

[c] Third Embodiment

In the second embodiment, the example has been described in which random numbers or the like are used as the seeds, but embodiments are not limited to this example. For example, normal data used for training may be used as the seeds that are used in the second embodiment. This is particularly effective when the number of variations of normal data and abnormal data are large.

Figure 13:
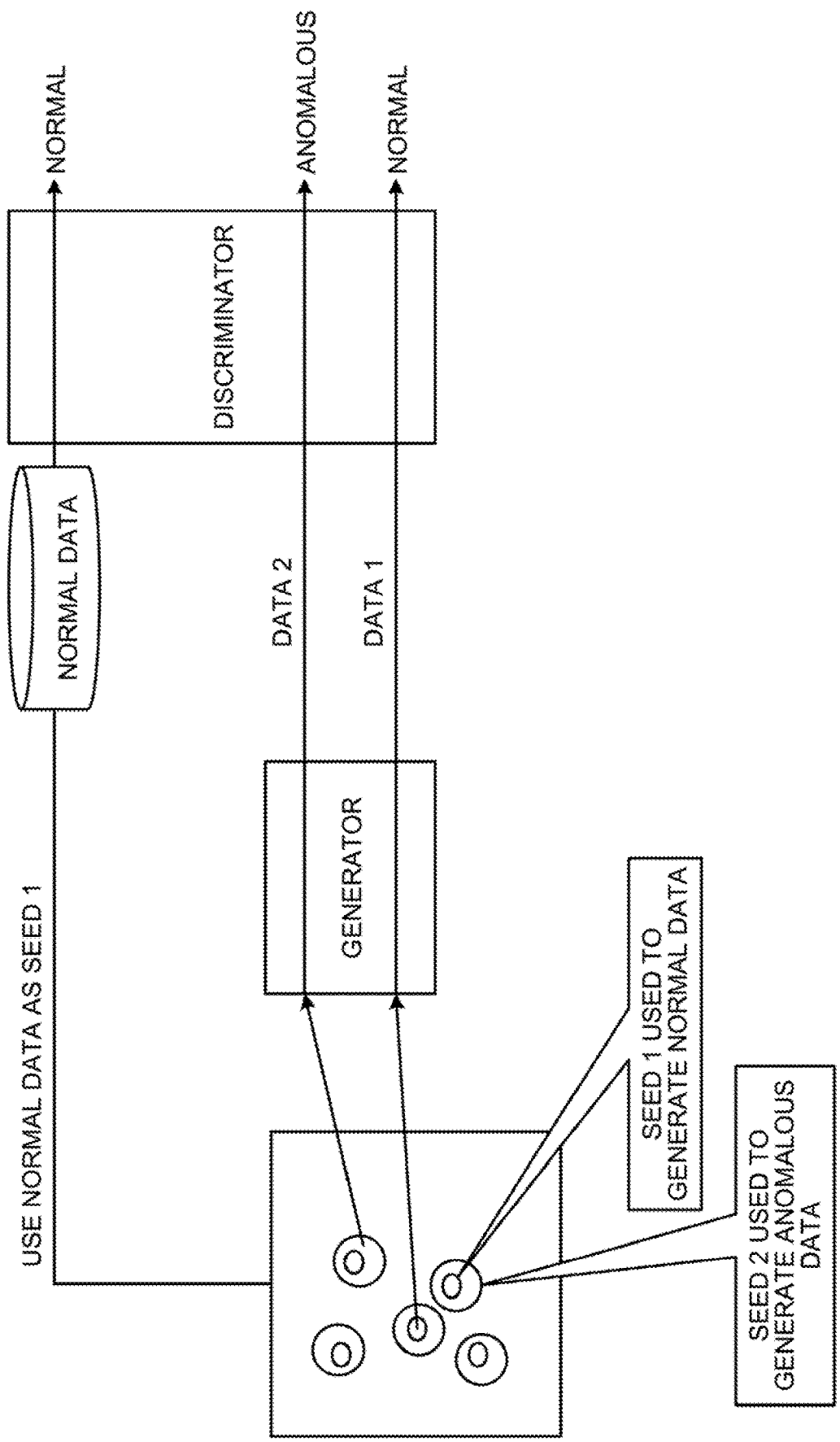
FIG. 13 is a diagram for explaining a training process according to a third embodiment.

FIG. 13 is a diagram for explaining a training process according to a third embodiment. As illustrated in FIG. 13, the training processing unit 30 stores each piece of normal data, which has been stored in advance in the normal data DB 13, as the seed 1 in the source information DB 14. Then, the training processing unit 30 sets a range in the vicinity of each of the seeds 1 stored in the source information DB 14 as each of the seeds 2. In other words, the training processing unit 30 sets the seeds 1 to be used to generate normal data that confuses the discriminator and the seeds 2 to be used to generate abnormal data that does not confuse the discriminator.

Then, the training processing unit 30 performs training based on the normal GAN, and, at a constant rate, generates the data 1 using the seed 1, generates the data 2 using the seed 2, and inputs each of the data 1 and the data 2 to the discriminator. Thereafter, the same training as that of the first embodiment is performed.

With this configuration, the training processing unit 30 is able to accurately generate abnormal data that is desired to be eventually detected, where the abnormal data is expected to present in the vicinity of normal data; therefore, it is possible to train the discriminator by using the abnormal data, so that it is possible to improve the accuracy of the discriminator.

[d] Fourth Embodiment

While the embodiments of the present invention have been described above, the present invention may be embodied in various forms other than the above-described embodiments.

Training

For example, a timing to terminate the training process can be set to an arbitrarily time point, such as a time point at which using a predetermined number or more of pieces of training data is completed or a time point at which the loss of the discriminator decreases to below a threshold. Further, the technique can be applied to various fields in which it is determined whether unauthorized invasion has occurred or hazardous materials are brought in, in addition to application to medical image data.

Constant Rate

For example, the training processing unit 30 is able to arbitrarily change setting of the constant rate, such as once every 10 times of training, or one-tenth of the number of times of training if the number of times of training is set in advance to 100 or the like. Further, the training processing unit 30 is able to generate the data 1 and the data 2 as described above and perform each training at a timing at which the loss of the discriminator increases and thereafter decreases.

System

The processing procedures, control procedures, specific names, and information including various kinds of data and parameters illustrated in the above-described document and drawings may be arbitrarily changed unless otherwise specified.

Further, the components of the apparatuses illustrated in the drawings are functionally conceptual and need not necessarily be physically configured in the manner illustrated in the drawings. In other words, specific forms of distribution and integration of the apparatuses are not limited to those illustrated in the drawings. Namely, all or part of the apparatuses may be functionally or physically distributed or integrated in arbitrary units depending on various loads or use conditions. For example, the training processing unit 30 and the detecting unit 40 may be implemented by different apparatuses.

Furthermore, for each processing function performed by each apparatus, all or any part of the processing function may be implemented by a CPU and a program analyzed and executed by the CPU or may be implemented as hardware by wired logic.

Hardware

Figure 14:
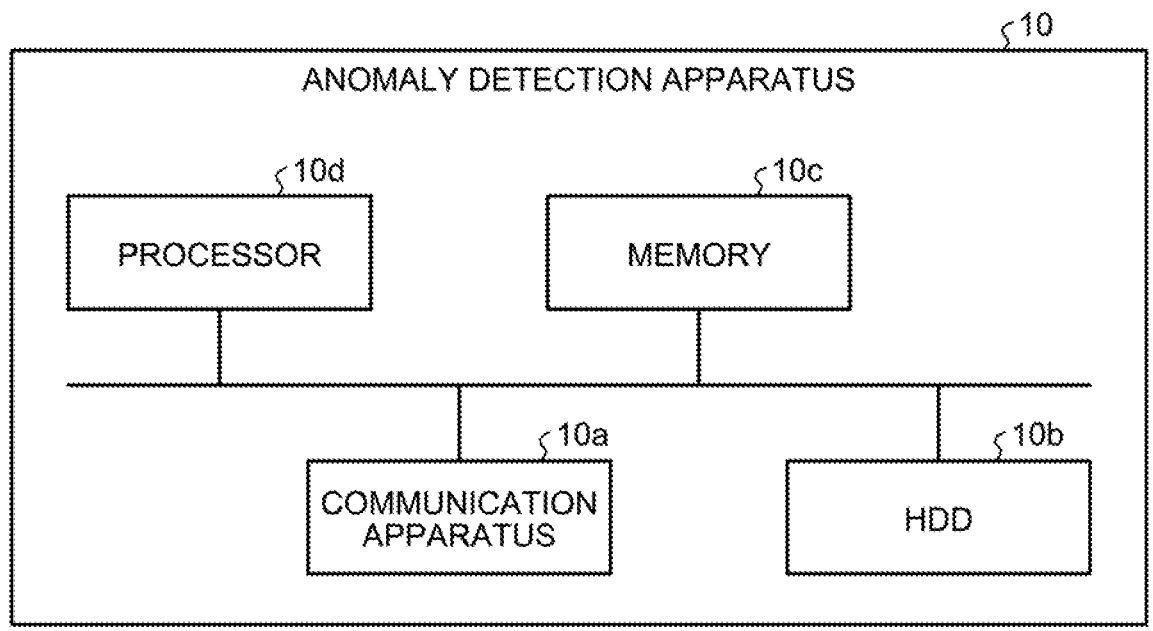
FIG. 14 is a diagram for explaining a hardware configuration example.
Figure 15:
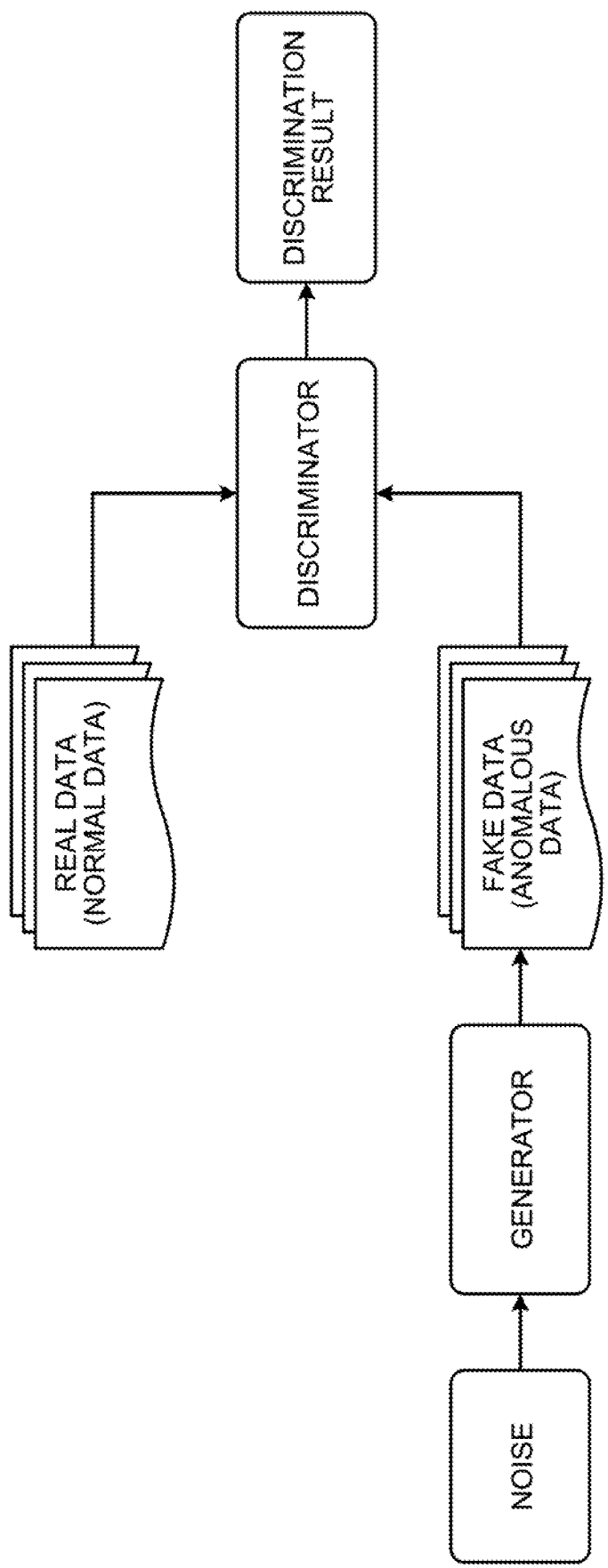
FIG. 15 is a diagram for explaining a GAN.

FIG. 14 is a diagram for explaining a hardware configuration example. As illustrated in FIG. 14, the abnormality detection apparatus 10 includes a communication apparatus 10a, a hard disk drive (HDD) 10b, a memory 10c, and a processor 10d. All of the units illustrated in FIG. 14 are connected to one another via a bus or the like.

The communication apparatus 10a is a network interface card or the like, and performs communication with other servers. The HDD 10b stores therein a program for operating the functions as illustrated in FIG. 6 and DBs.

The processor 10d reads a program for executing the same process as that of each of the processing units illustrated in FIG. 6 from the HDD 10b or the like, and loads the program on the memory 10c, so that the process for implementing each of the functions described with reference to FIG. 6 etc. are operated. In other words, the process implements the same functions as those of all of the processing units included in the anomaly detection apparatus 10. Specifically, the processor 10d reads, from the HDD 10b or the like, a program that has the same functions as those of the training processing unit 30, the detecting unit 40, and the like. Then, the processor 10d performs the process for implementing the same processes as those of the training processing unit 30, the detecting unit 40, and the like.

In this manner, the anomaly detection apparatus 10, by reading and executing the program, functions as the information processing apparatus that performs an anomalous detection method. Furthermore, the anomaly detection apparatus 10 may be able to cause a medium reading device to read the above-described program from a recording medium and execute the read program, to thereby implement the same functions as those of the embodiments as described above. Meanwhile, the program described in the other embodiments need not always be executed by the anomaly detection apparatus 10. For example, the present invention can be applied in the same manner when a different computer or a different server executes the program or the different computer and the different server execute the program in a cooperative manner.

According to the embodiments, it is possible to prevent reduction of the capability of a discriminator to detect anomalies.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A training apparatus comprising:
a memory; and
a processor coupled to the memory, wherein the processor is configured to:
generate pieces of image data using a generator;
train the generator and a discriminator that discriminates whether a piece of image data input thereto is real or fake;
using the generator, generate the pieces of image data that are to be discriminated as normal data by the discriminator wherein the normal data is stored in the memory in advance, and generate a piece of specified image data that is to be discriminated as anomalous data by the discriminator wherein the anomalous data is generated by the generator at a fixed rate with respect to the pieces of image data;
train the discriminator to discriminate whether one of the pieces of image data and the piece of specified image data input from the generator is the normal data or the anomalous data so as to minimize a discrimination error thereof;
when the pieces of image data is generated and input to the discriminator, train the discriminator so as to maximize the discrimination error and train the generator so as to minimize the discrimination error; and
when the piece of specified image data is generated and input to the discriminator, train the discriminator so as to minimize the discrimination error and train the generator so as to maximize the discrimination error.

2. The training apparatus according to claim 1, wherein the processor is further configured to:
when the pieces of image data are generated and input to the discriminator, train the discriminator such that the discriminator discriminates the input pieces of image data as the anomalous data and train the generator such that the discriminator discriminates the input pieces of image data as the normal data; and
when the piece of specified image data is generated and input to the discriminator, train the discriminator such that the discriminator discriminates the piece of specified image data as the anomalous data and train the generator such that the discriminator discriminates the piece of specified image data as the anomalous data.

3. The training apparatus according to claim 1, wherein, the processor is further configured to:
set, in a space of seeds as a source for generating a piece of image data, a first region including a first seed, and a second region including a second seed that is present in a vicinity of the first seed but that is not included in the first region; and
generate the pieces of image data by using the first seed, and generate the piece of specified image data by using the second seed.

4. The training apparatus according to claim 1, wherein, the processor is further configured to:
set, in a space of seeds as a source for generating a piece of image data, a first region including a first seed, and a second region including a second seed that is present in a vicinity of the first seed but that is not included in the first region, and register the normal data as the first seed in the first region;
generate the pieces of image data by using the normal data included in the first region, and generate the piece of specified image data by using the second seed.

5. The training apparatus according to claim 1, wherein the processor is further configured to, when discrimination target image data is divided into a plurality of regions, which is then input to discriminator that is trained, and when the discriminator detects an anomaly, present a region that is indicated as anomalous by the discriminator.

6. A training method comprising:
causing a generator to generate pieces of image data, using a processor;
training the generator and a discriminator that discriminates whether a piece of image data input thereto is real or fake, using the processor;
using the generator generating the pieces of image data that are to be discriminated as normal data by the discriminator wherein the normal data is stored in the memory in advance, and generating a piece of specified image data that is to be discriminated as anomalous data by the discriminator wherein the anomalous data is generated by the generator at a fixed rate with respect to the pieces of image data, using the processor;
training the discriminator to discriminate whether one of the pieces of image data and the piece of specified image data, input from the generator is the normal data or the anomalous data so as to minimize a discrimination error thereof, using the processor;
when the pieces of image data is generated and input to the discriminator, training the discriminator so as to maximize the discrimination error and training the generator so as to minimize the discrimination error, using the processor; and
when the piece of specified image data is generated and input to the discriminator, training the discriminator so as to minimize the discrimination error and training the generator so as to maximize the discrimination error, using the processor.

7. A non-transitory computer-readable recording medium having stored therein a training program that causes a computer to execute a process comprising:
generating pieces of image data using a generator;
training the generator and a discriminator that discriminates whether a piece of image data input thereto is real or fake;
using the generator generating the pieces of image data that are to be discriminated as normal data by the discriminator wherein the normal data is stored in the memory in advance, and generating a piece of specified image data that is to be discriminated as anomalous data by the discriminator wherein the anomalous data is generated by the generator at a fixed rate with respect to the pieces of image data;
training the discriminator to discriminate whether one of the pieces of image data and the piece of specified image data input from the generator is the normal data or the anomalous data so as to minimize a discrimination error thereof;
when the pieces of image data is generated and input to the discriminator, training the discriminator so as to maximize the discrimination error and training the generator so as to minimize the discrimination error; and
when the piece of specified image data is generated and input to the discriminator, training the discriminator so as to minimize the discrimination error and training the generator so as to maximize the discrimination error.

* * * * *